United States Patent [19]

Arnett et al.

[11] Patent Number: 5,357,520
[45] Date of Patent: Oct. 18, 1994

[54] METHOD AND APPARATUS FOR PRECOMPENSATION VALUE DETERMINATION IN A PRML DATA CHANNEL

[75] Inventors: Patrick C. Arnett, Morgan Hill, Calif.; Jonathan D. Coker; Richard L. Galbraith, both of Rochester, Minn.; Yaw-Shing Tang, Saratoga; Roger W. Wood, Gilroy, both of Calif.

[73] Assignee: International Business Machines Corporation, Armonk, N.Y.

[21] Appl. No.: 830,032

[22] Filed: Jan. 31, 1992

[51] Int. Cl.⁵ .............................................. G11C 29/00
[52] U.S. Cl. .................... 371/21.2; 371/21.4
[58] Field of Search ............... 371/21.2, 21.4, 21.5

[56] References Cited

U.S. PATENT DOCUMENTS

| | | | |
|---|---|---|---|
| 4,415,938 | 11/1983 | Heitmann | 360/53 |
| 4,612,586 | 9/1986 | Sordello et al. | 360/31 |
| 4,746,991 | 5/1988 | Efran et al. | 358/335 |
| 4,757,406 | 7/1988 | Stewart et al. | 360/51 |
| 4,907,100 | 3/1990 | Nishiyama et al. | 360/45 |
| 4,929,894 | 5/1990 | Monett | 329/212 |
| 4,970,609 | 11/1990 | Cunningham et al. | 360/51 |
| 5,050,169 | 9/1991 | Monett | 371/21.2 |
| 5,121,263 | 6/1992 | Kerwin et al. | 360/53 |
| 5,168,413 | 12/1992 | Coker et al. | 360/137 |
| 5,220,466 | 6/1993 | Coker et al. | 360/46 |
| 5,241,546 | 8/1993 | Peterson et al. | 371/37.1 |
| 5,262,904 | 11/1993 | Tang et al. | 360/45 |

OTHER PUBLICATIONS

Coker et al. "Magnetic Characterization Using Elements of a PRML Channel" IEEE Trans on Magnetics vol. 27, No. 6, Nov. 1991, pp. 4544–4547.

Hong et al. "An Experimental 180 Mb/sec PRML Channel for Magnetic Recording" IEEE Trans on Magnetics vol. 27, No. 6, Nov. 1991, pp. 4532–4537.

Coker et al. "Implementation of PRML in a Rigid Disk Drive" IEEE Trans on Magnetics vol. 27, No. 6, Nov. 1991 pp. 4538–4543.

Dolivo, F. "Signal Processing for High Density Digital Magnetic Recording" IEEE 1989 pp. 1-91-1-96.

*Primary Examiner*—Robert W. Beausoliel, Jr.
*Assistant Examiner*—Joseph E. Palys
*Attorney, Agent, or Firm*—Joan Pennington; Richard E. Billion; Pryor A. Garnett

[57] ABSTRACT

A method and apparatus are provided for determining an adjustable precompensation value in a partial-response maximum-likelihood (PRML) data channel. The PRML data channel includes an adjustable precompensation function for modulating the write data waveform. A predetermined test pattern is written using write circuitry in the disk file. The predetermined test pattern is insensitive to channel misequalization and provides a reference for gain and timing control. The written predetermined test pattern is read back using read circuitry in the disk file. An error in sample values in the read back predetermined test pattern is identified using logic provided in the PRML data channel while performing a standard read operation of a data sector written with the test pattern. The adjustable write precompensation value is adjusted responsive to identifying an error.

6 Claims, 6 Drawing Sheets

METHOD AND APPARATUS FOR PRECOMPENSATION VALUE DETERMINATION IN A PRML DATA CHANNEL

BACKGROUND OF THE INVENTION

1. Field of the Invention

The invention relates generally to a direct access storage device (DASD) of the type utilizing partial-response maximum-likelihood (PRML) detection, and more particularly to a method and apparatus for precompensation value determination in a PRML data channel.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Partial-response signaling with maximum-likelihood sequence detection techniques are known for digital data communication and recording applications. Achievement of high data density and high data rates has resulted in the use of a PRML channel for writing and reading digital data on the disks.

Nonlinear bit shift (NLBS) in magnetic recording is the shift in position of a written transition due to the proximity effect of a preceding transition. In PRML, the readback waveform is synchronously sampled at regular intervals. Sample values depend on the position of written transitions. Therefore an unwanted shift, such as a nonlinear bit shift, leads to error in sample values which, in turn, degrades the performance of the PRML channel. Write precompensation or precomp is employed to counteract NLBS in the magnetics by shifting the transition during writing. However, known methods for measuring the NLBS and adjusting the write precomp add complexity to the PRML channel.

For example, one proposed method for measuring NLBS is to define a dibit response with two isolated transitions and identify their positions. Another proposed method uses a specially designed psuedo-random sequence to determine an impulse response. The bit shift is then measured by an echo at a known position. Both methods require complicated data manipulation and high precision waveform recording. A third method identifies the Volterra kernels of a nonlinear system. These methods are relatively complex and slow. A fourth method uses a special bit pattern and a frequency selective receiver to measure the NLBS. The bit pattern is designed to eliminate predefined frequency components when all bits are written without any NLBS and the magnitude of the frequency when detected can be used to adjust the write precomp to compensate for NLBS. Hardware not normally present in a PRML channel is required for the fourth method.

Disadvantages of the above-described and other known arrangements include both the additional hardware and time required for performing the write precompensation adjustment methods.

SUMMARY OF THE INVENTION

A principal object of the present invention is to provide an improved method for determining an adjustable write precompensation value in a PRML data channel in a disk drive data storage system. Other objects are to provide improved write precompensation adjustment methods substantially without negative effects and that overcome many of the disadvantages of prior art arrangements.

In brief, the objects and advantages of the present invention are achieved by method and apparatus for precompensation value determination in a partial-response maximum-likelihood (PRML) data channel. The PRML data channel includes an adjustable precompensation function for modulating the write data waveform. A predetermined test pattern is written using write circuitry in the disk file. The predetermined test pattern is insensitive to channel misequalization and provides a reference for gain and timing control. The written predetermined test pattern is read back using read circuitry in the disk file. An error in sample values in the read back predetermined test pattern is identified using logic provided in the PRML data channel while performing a standard read operation of a data sector written with the test pattern. The adjustable write precompensation value is adjusted responsive to identifying an error.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
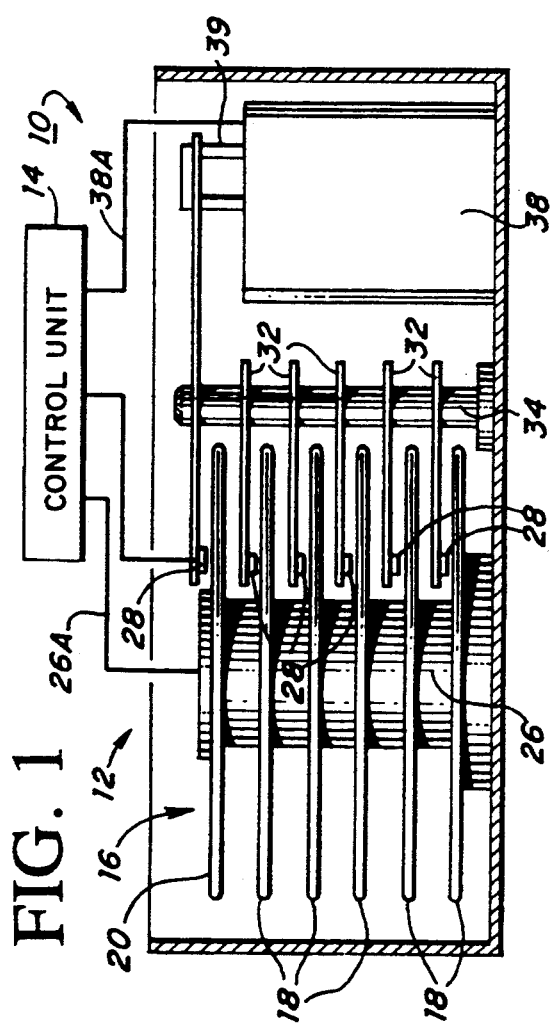
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
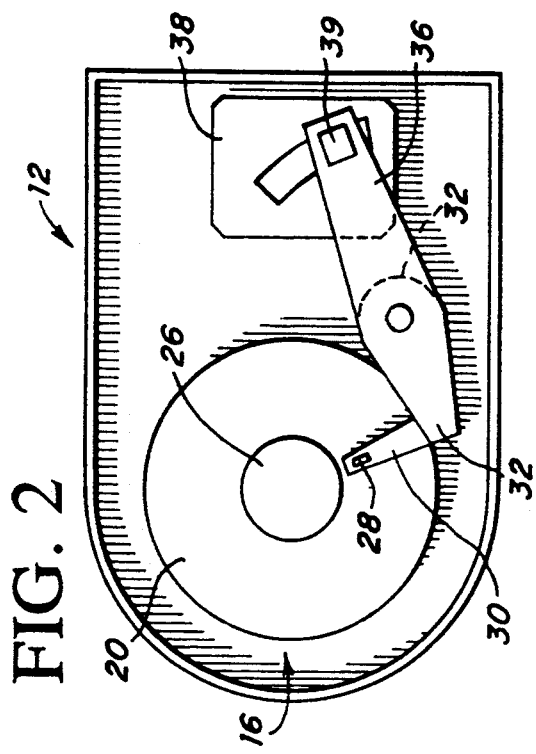
FIG. 2 is a diagram showing the accessing mechanism for a single disk surface of the apparatus of FIG. 1.

Referring now to FIGS. 1 and 2 of the drawing, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 39 cooperating with a magnet and core assembly (not seen) operatively controlled for moving the transducer heads 28 in synchronism in a radial direction in order to position the heads in registration with data cylinders to be followed. The VCM 39 is movable within a fixed magnetic field, and the direction and velocity of the coil movement is controlled by the current supplied. The various components of the disk file 10 are controlled in operation by signals generated by control unit 14 such as motor control signals on line 26A and position control signals on line 38A.

Figure 3:
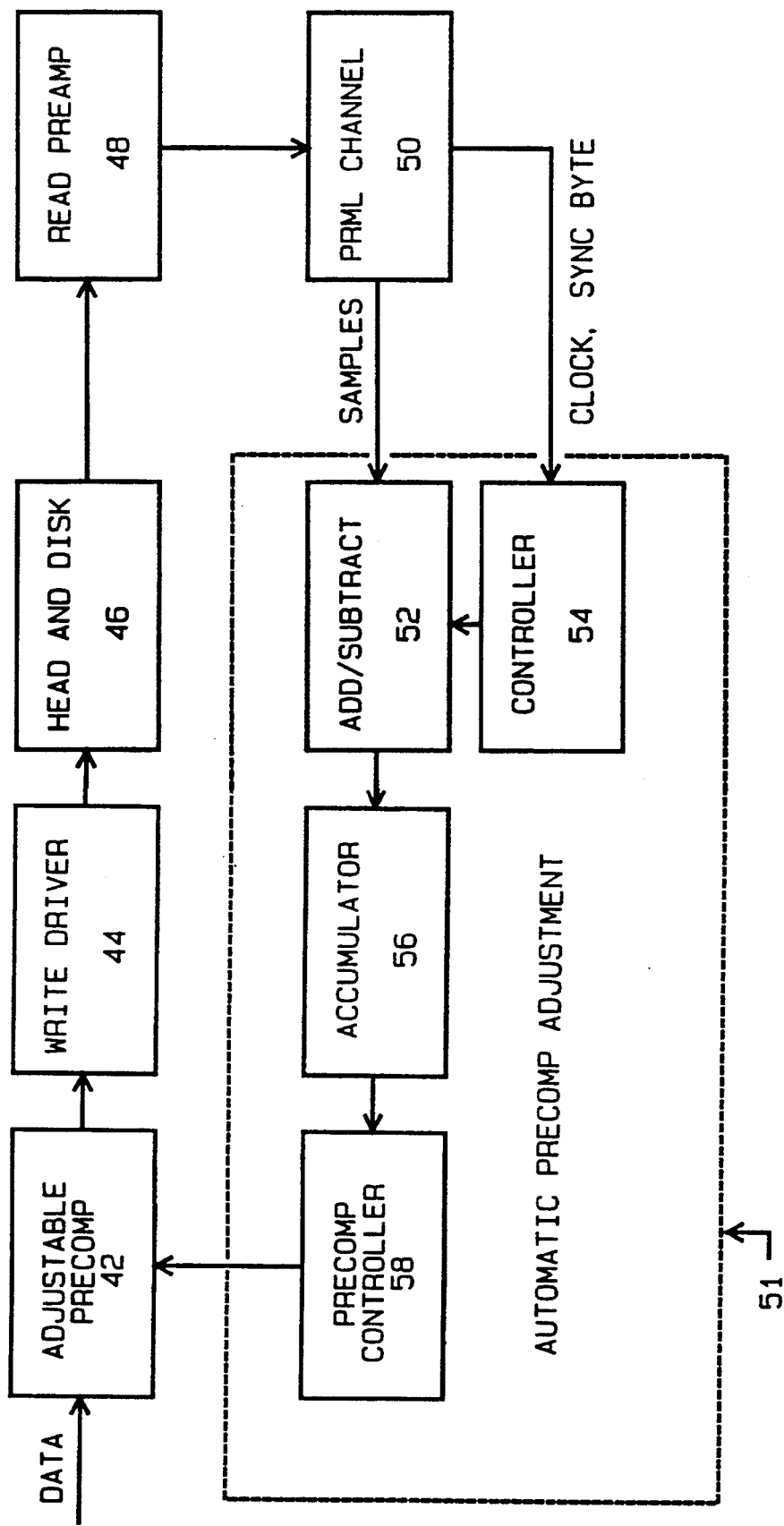
FIG. 3 is a diagram illustrating apparatus within a PRML data channel for carrying out write precompensation value determination according to methods of the present invention in the data storage disk file of FIG. 1.

Referring now to FIG. 3, there is shown a block diagram of the PRML data channel generally designated 40 for carrying out write precompensation value determination methods of the invention. In accordance with a feature of the present invention, write precompensation value determination is an integrated or embedded function of a partial-response maximum-likelihood (PRML) recording channel 40 available in the disk file 10, so that no external test equipment is required. A PRML adjustable precompensation function or precomp 42 provides a modulated binary pulse signal applied to a write driver circuit 44 that provides the modulated write current for writing to the disk surface. An analog read signal is obtained at head and disk block 46 and the read signal is applied to a read preamplifier 48. The amplified read signal is applied to a PRML channel detection block 50.

A test pattern is written on the disk 20 using the standard drive write circuits and then read back using the standard drive read circuits. Automatic precomp 40 adjustment logic generally designated 51 is used to compute a precompensation adjustment value while performing a standard read operation of a data sector written with the test pattern.

Samples of the PRML channel detection block 50 are applied to an add/subtract block 52. Clock and sync signals of the PRML channel detection block 50 are applied to a controller 54 coupled to the add/subtract block 52. An accumulator 56 coupled to the add/subtract block 52 provides an accumulated difference that is proportional to required adjustment of the precomp 42 to compensate for the measured non-linear bit shift (NLBS). The accumulated difference output of the accumulator 56 is applied to a precomp controller 58. Precomp controller 58 is coupled to the adjustable precomp 42 for adjusting the precompensation value.

Figure 4:
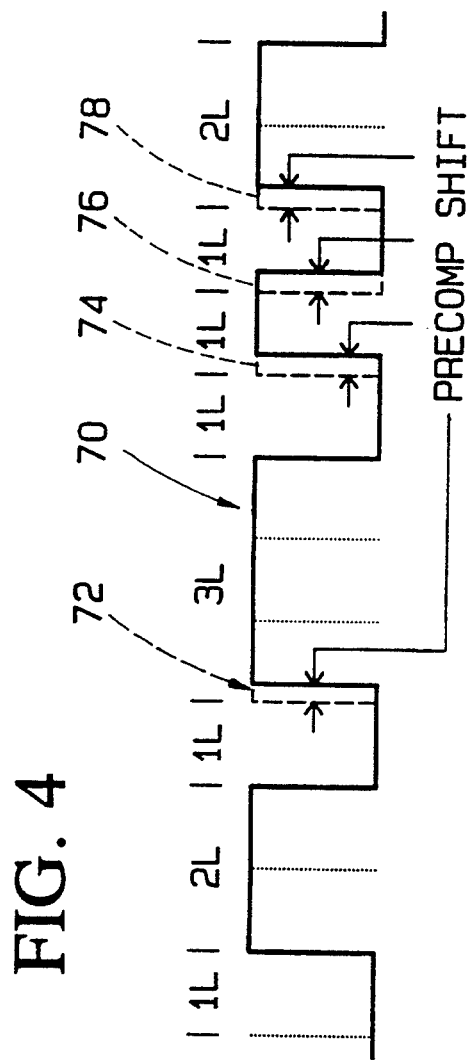
FIGS. 4, 5, 6, 7, 8, 9, 10, 11 and 12 are graphs to illustrate the operation of write precompensation value determination methods of the present invention.

FIG. 4 illustrates the effect of the PRML precomp 42 on an illustrated write data waveform generally designated 70. A non-linear bit shift adjustment or precomp shift 72 illustrates delaying in time the trailing edge of the shortest 1-length magnets which effectively provides the shortest magnets as being wider. The PRML precomp 42 is employed to counteract NLBS in the magnetics with a net result of a more linear write-to-read function of the channel signal path. At precomp shift designated 74, the first of multiple short magnets occurring together is widened and the following precomp shifts 76 and 78 are block shifted. The precomp shifts do not result in a net write signal delay because for any magnet which is effectively widened, another magnet will be shortened by the same delay.

Figure 5:
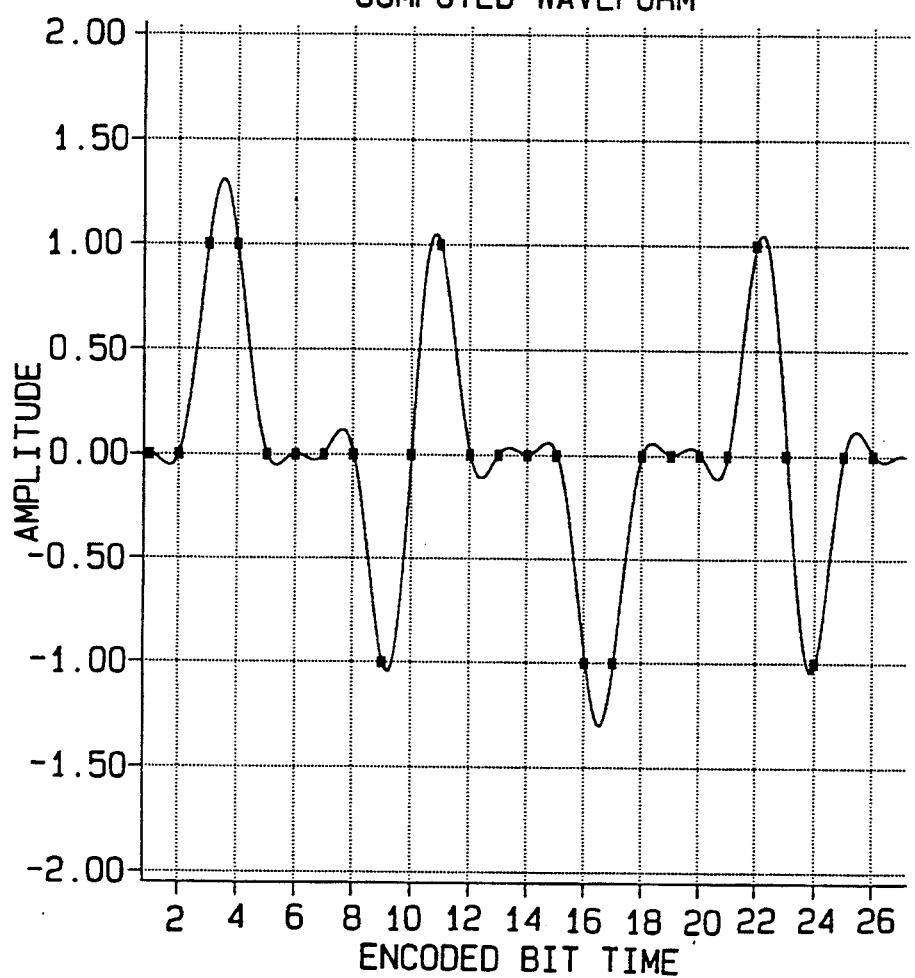

FIG. 5 illustrates a predefined testing pattern that in the absence of nonlinear bit shift effects, provides the following sequence denoted S(k) of sample values for consecutive encoded bit times:
00110000-1010000-1-1000010-100
NLBS can be measured using linear superposition of predefined sample values obtained in the PRML channel 50, such as the S(4) equal to 1 and S(16) equal to −1 from the two isolated pulses and S(23) from the zero sample in the middle of the dibit contained in the predefined testing pattern of FIG. 5. Note that S(23) is exactly the sum of the 1 and −1 samples in the isolated transitions or S(4) and S(16) in the sequence. A measure of the goodness of the precompensation is identified by a difference E1 given by:

$$E1 = S(4) + S(16) - S(23)$$

To reduce the error due to positive-negative asymmetry of the waveform, a second difference E2 given by:

$$E2 = S(3) + S(17) - S(10)$$

is identified and the difference between E1 and E2 can be used as the error indicator given by:

$$E = E1 - E2$$

The controller 54 determines whether the sample should be added for (S(4), S(16), S(10)) or subtracted for (S(3), S(17), S(23)). To obtain a precomp adjustment value, the total difference E over a predefined number of repetition of the signal pattern in FIG. 5 is obtained in the accumulator 56. The total difference E is divided by two times the number of pattern repetition to obtain an average sample error. The amount of bit shift is calculated by the precomp controller 58 by dividing the magnitude of the average sample error with the slope at the sampling point S(3) or S(16) which are typically close in magnitude but opposite in sign. The slope would be estimated either theoretically or experimentally. The direction of the shift is given by the sign of E. To improve accuracy, one can apply the calculated precomp value to the test pattern and repeat the above procedure until a satisfactory error E is achieved. Alternatively, one can search for the minimum magnitude of E by testing a range of precomp values without the need for calculating the shift. It is also possible to use other sets of samples to check linear superposition.

Figure 6:
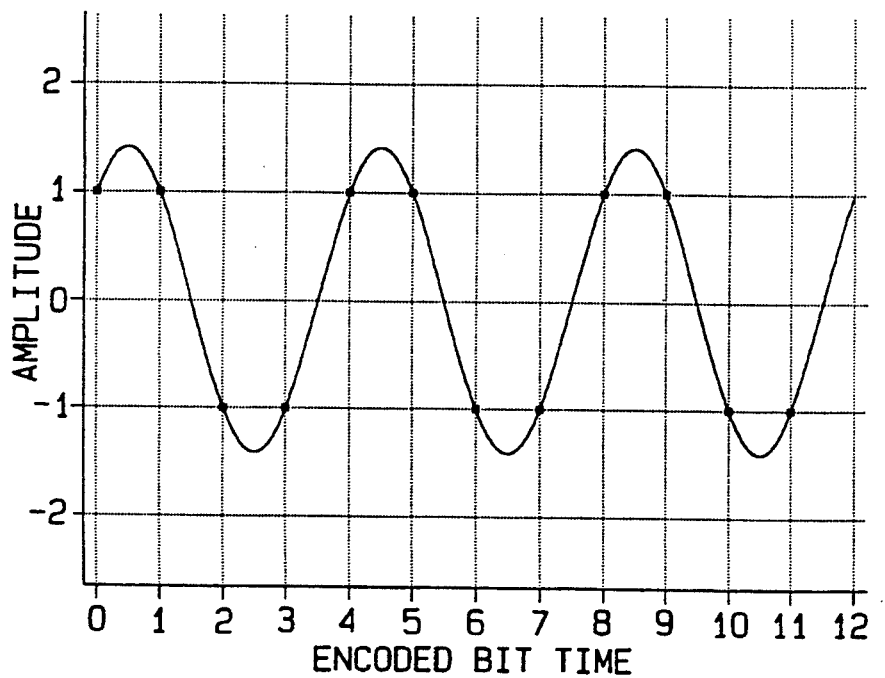

Referring now to FIGS. 6–12, there are shown graphs illustrating a preferred test pattern used for measuring NLBS that contains two component parts. This preferred embodiment further simplifies the implementation by accumulating the errors of zero samples only. In FIG. 6, expected amplitude values corresponding to a first component part are shown relative to the vertical axis and encoded bit time values are shown relative to the horizontal axis. The first component part of the test pattern is written as repeating 2-length magnets providing a sinewave read waveform. The frequency of the sinewave is near the center of the channel passband. There is negligible NLBS present in the first component part of the test pattern because 1-length magnets are not used in writing the pattern.

Figure 7:
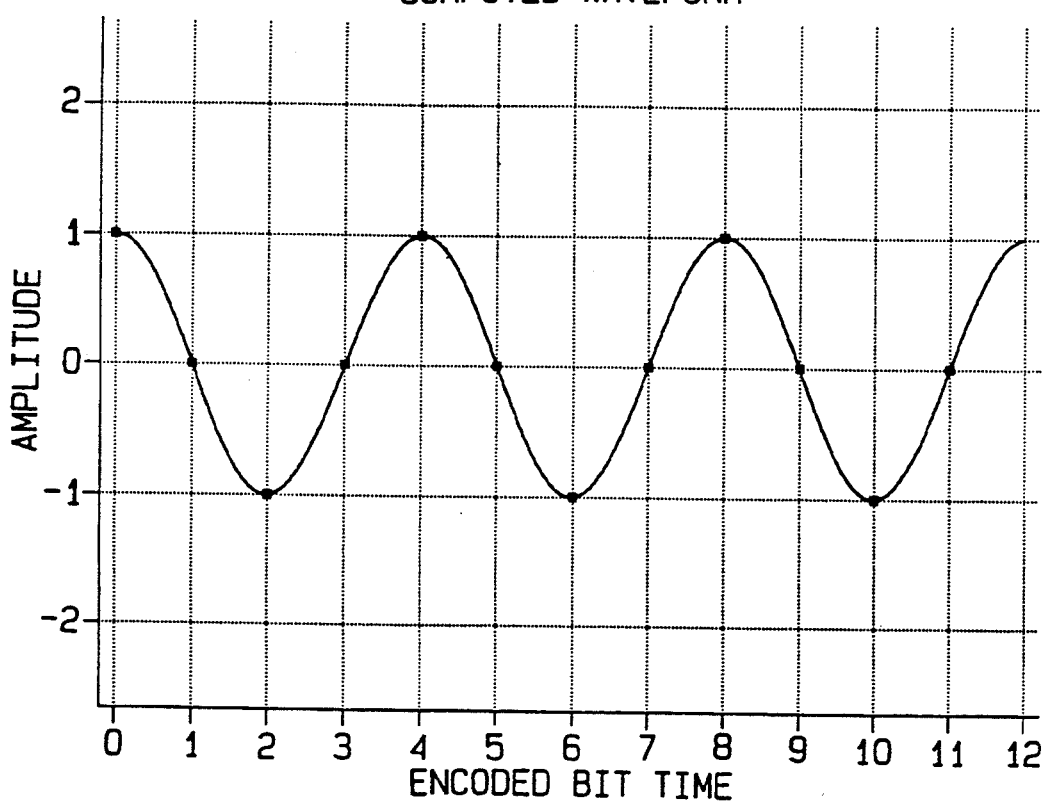

FIG. 7 illustrates a second component part of the test pattern that is written as repeating 1 and 3 length magnets and provides a sinewave read waveform of the same frequency as the first component part of the test pattern. Because 1-length magnets are used for writing the second component part of the test pattern, the effects of any NLBS are included in the second component part of the test pattern. FIG. 7 shows the case with no nonlinear bit shift.

Figure 8:
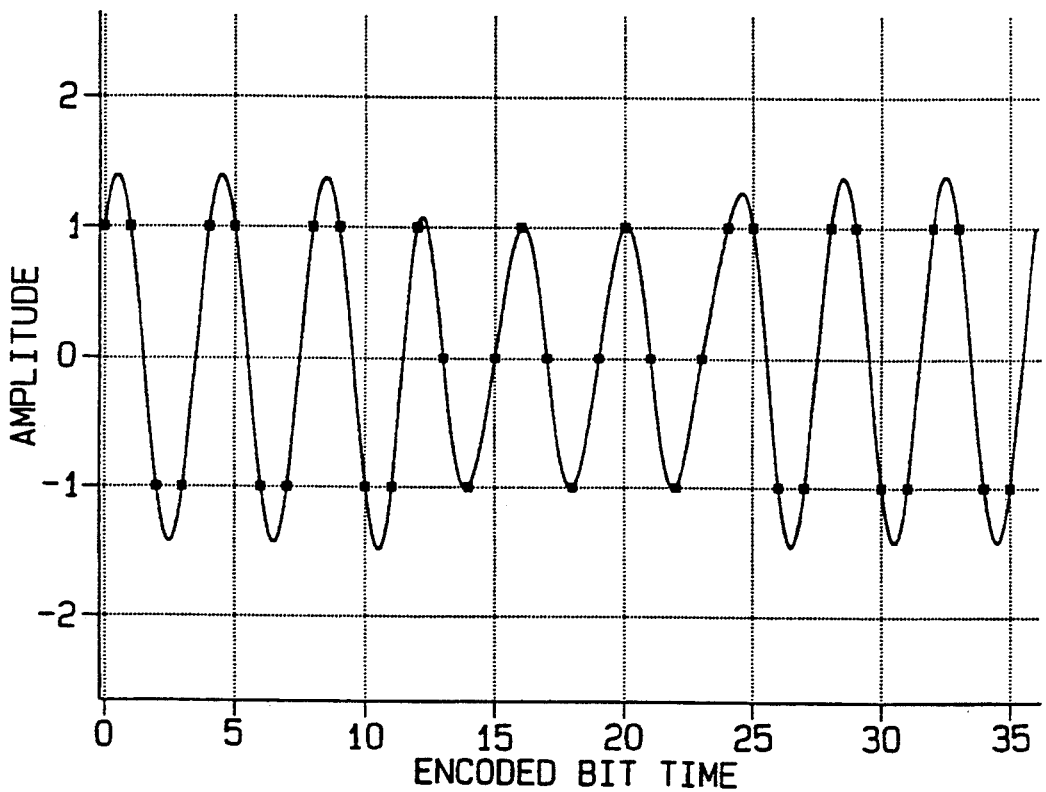
Figure 9:
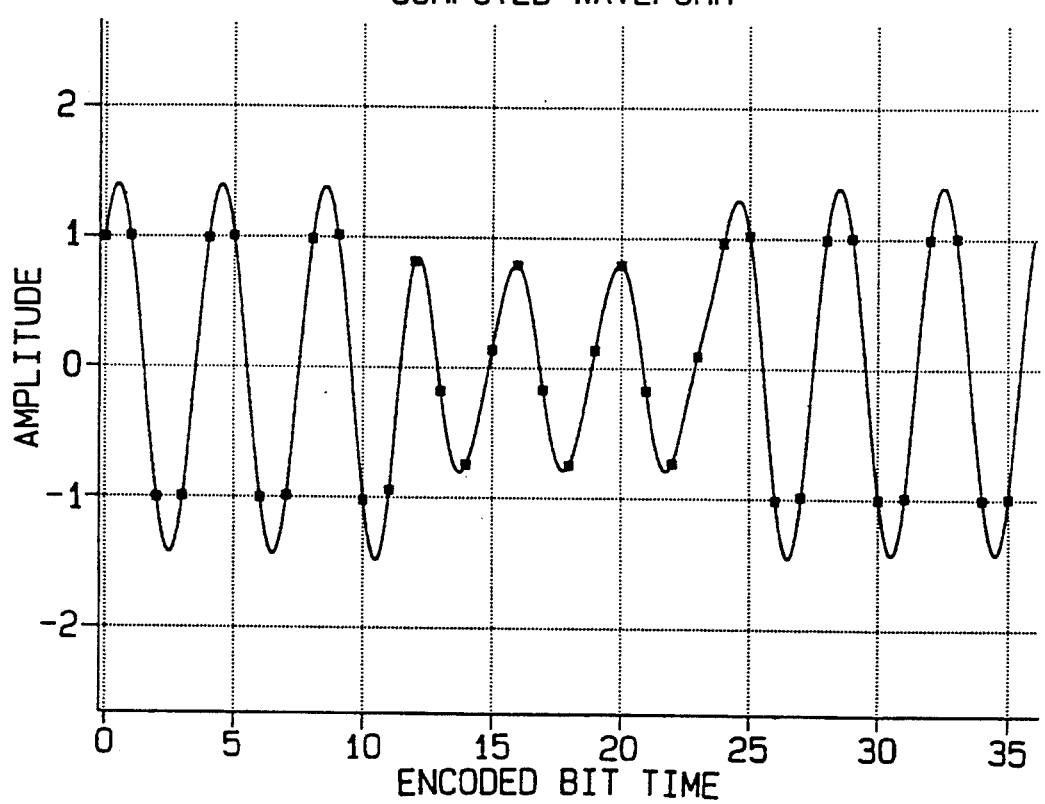

FIGS. 8 and 9 illustrate corresponding graphs of combined first and second components of the test pattern without and with NLBS effects. In FIG. 8, the two components are shown combined under ideal linear conditions. FIG. 9 illustrates the two components combined with a NLBS effect present. Note in FIG. 9 that the first test pattern component is substantially unaffected by the NLBS and the second test pattern component is shifted in such a way that the samples taken by the PRML channel are substantially different.

Figure 10:
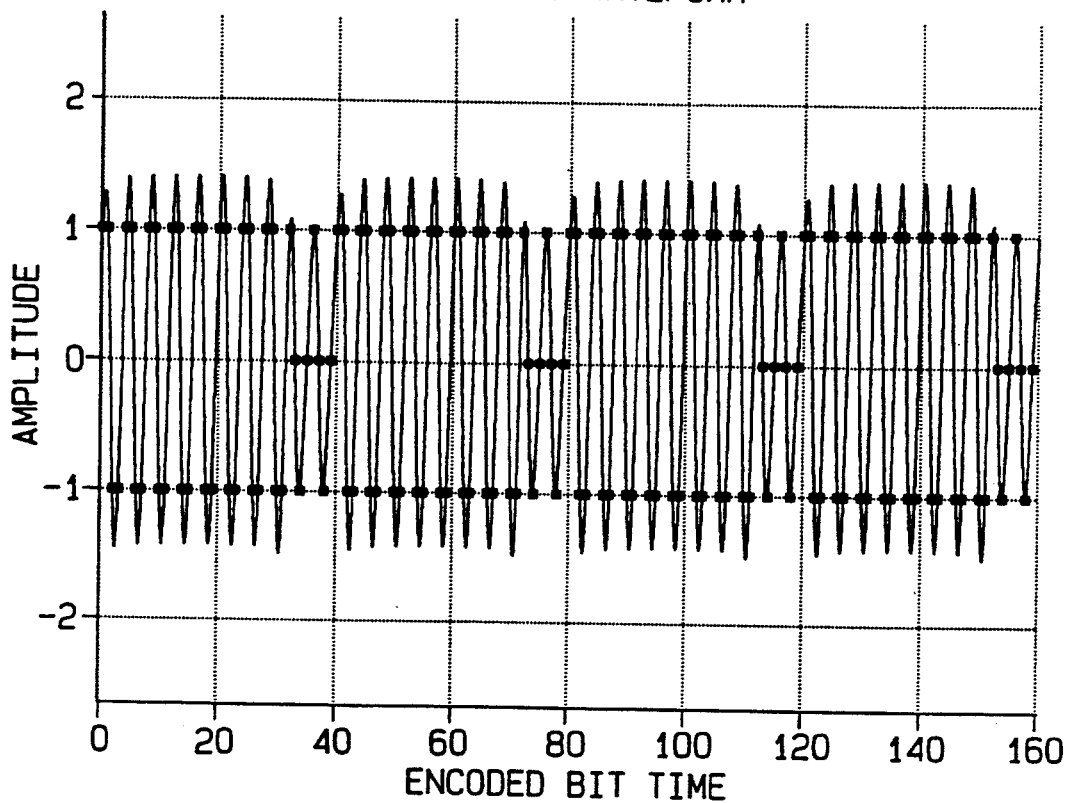

FIG. 10 illustrates the first and second components of the combined test pattern relative to 160 encoded bit times.

As shown in FIGS. 9, 10, the first component part is dominant. The first component part of the test pattern provides a reference pattern for sampling gain and timing control for the PRML channel. The zero samples in the second component part are used to generate the error terms for measuring NLBS. The error in the zero samples from the base line are multiplied by the slope of the signal, either 1 or −1 and integrated digitally in order to obtain an adjustment value for the adjustable precomp 42. A timing mode can be used in the timing loop of the channel such that the +1 and −1 samples in the first component part are used for timing correction error terms with the samples of the second component part gated off so as to provide no timing information to the channel.

Figure 11:
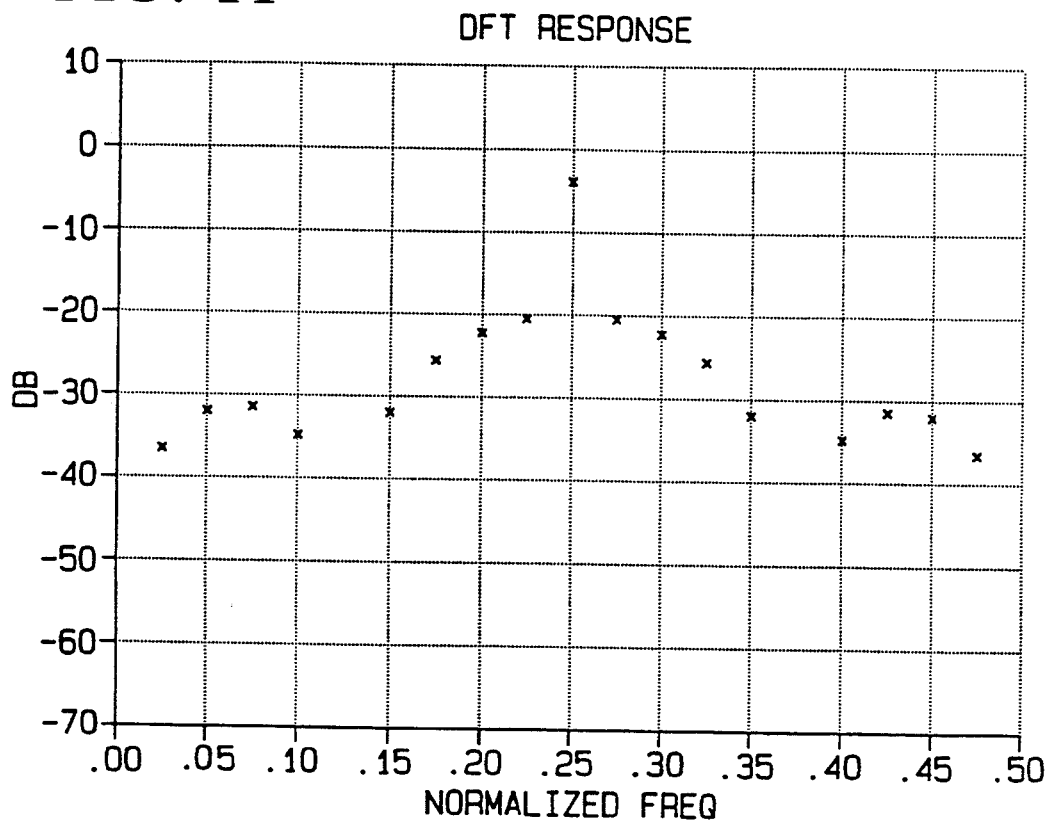

FIG. 11 illustrates the discrete fourier transform (DFT) response or relative frequency components contained in the test pattern. As shown in FIG. 11, the test pattern is dominated by one frequency component so that the measurement of NLBS is insensitive to channel misequalization.

Figure 12:
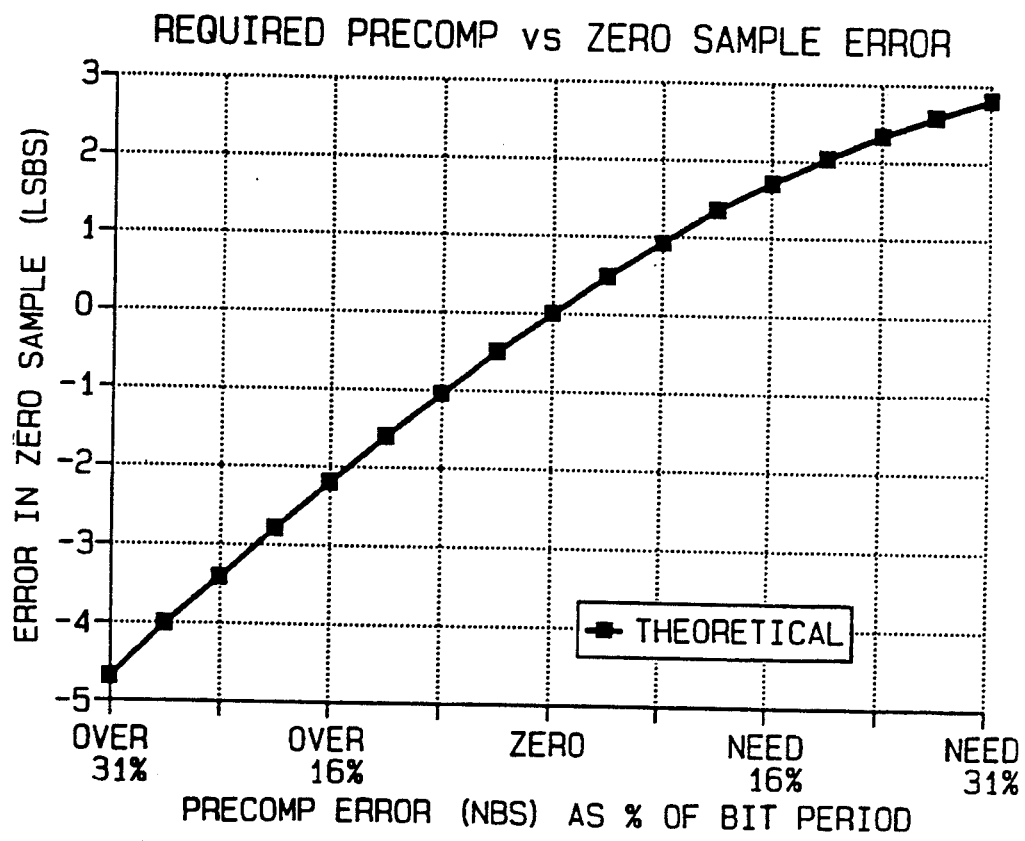

FIG. 12 provides a translation between the error in the zero samples of the test pattern and a required precomp value as a percentage of a bit period.

What is claimed and desired to be secured by Letters Patent of the United States is:

1. Apparatus for determining an adjustable write precompensation value in a partial-response maximum-likelihood (PRML) data channel including an adjustable precompensation function for modulating the write data waveform, said apparatus comprising:
   means for writing a predetermined test pattern;
   means for reading back said written predetermined test pattern;
   means for detecting an error in sample values in said read back predetermined test pattern;
   means for adjusting said adjustable write precompensation value responsive to said means for detecting an error;
   said error detecting means and said adjustable write precompensation value adjusting means being included within said PRML data channel; and
   wherein said predetermined test pattern has a selected dominant frequency component and said predetermined test pattern is insensitive to PRML channel misequalization; and
   wherein said predetermined test pattern includes a first component part and a second component part, said first component part providing a reference pattern for gain and timing control and said second component part being used by said error detecting means; and
   wherein said first component part of said predetermined test pattern is written as repeating 2-length magnets.

2. Apparatus as recited in claim 1 wherein said second component part of said predetermined test pattern is written as repeating 1- and 3-length magnets.

3. Apparatus as recited in claim 2 wherein only said second component part is effected by nonlinear bit shift (NLBS).

4. A direct access storage device of the type including a partial-responsive maximum-likelihood (PRML) data channel comprising:
   a housing;
   at least one disk mounted in said housing for rotation about an axis and having at least one disk surface for storing data;
   transducer means mounted for movement across said disk surface for reading and writing data to said disk surface;
   an adjustable precompensation function for modulating the write data waveform coupled to said transducer means;
   said transducer means for writing a predetermined test pattern; said predetermined test pattern includes a first component part and a second component part, said first component part providing a reference pattern for gain and timing control and said second component part being used by said error detecting means;
   said transducer means for reading back said written predetermined test pattern; said first component part of said predetermined test pattern providing a reference pattern for gain and timing control;
   means for detecting an error in sample values in said read back predetermined test pattern;
   means for adjusting said adjustable write precompensation value of the responsive to detected error; and
   said PRML data channel including said error detecting means and said adjustable write precompensation value adjusting means.

5. A direct access storage device as recited in claim 4 wherein said predetermined test pattern has a selected dominant frequency component near the center of the channel passband.

6. A method for determining an adjustable write precompensation value in a partial-response maximum-likelihood (PRML) data channel including an adjustable precompensation function for modulating the write data waveform in a disk drive data storage file, said method comprising the steps of:
   writing a predetermined test pattern on a disk surface; said predetermined test pattern includes a first component part and a second component part;
   reading back said written predetermined test pattern utilizing said first component part for providing a reference pattern for gain and timing control;
   detecting predetermined zero sample values in a predefined portion of said second component part of said read back predetermined test pattern to identify an error;
   detecting both an amplitude and a slope of said identified sample error values; and
   adjusting said adjustable write precompensation value responsive to said detected amplitude and said slope of said identified sample error values.

* * * * *